March 13, 1951     J. M. CALDWELL     2,544,948

VARIABLE ORIFICE FLOW-CONTROL APPARATUS

Filed April 26, 1946     2 Sheets-Sheet 1

*INVENTOR.*
J. M. CALDWELL
BY
A. Yates Dowell
ATTORNEY

March 13, 1951  J. M. CALDWELL  2,544,948
VARIABLE ORIFICE FLOW-CONTROL APPARATUS
Filed April 26, 1946  2 Sheets-Sheet 2

INVENTOR.
J. M. CALDWELL
BY
A. Yates Dowell
ATTORNEY

Patented Mar. 13, 1951

2,544,948

UNITED STATES PATENT OFFICE 2,544,948

VARIABLE ORIFICE FLOW-CONTROL APPARATUS

Joseph Morton Caldwell, Arlington, Va.

Application April 26, 1946, Serial No. 665,196

5 Claims. (Cl. 222—70)

This invention relates to an improved method and apparatus for controlling flow of liquids and more particularly to a variable orifice flow-controlling apparatus and an improved method for accurately delivering water or other fluids at a selected rate.

Heretofore apparatus designed to control the flow of liquids through orifices into the atmosphere have been subject to inherent limitations in design which make it extremely difficult to measure accurately the velocity of flow over a period of time. This difficulty is much more pronounced when it is necessary to predetermine the volume of liquid to be delivered and vary the rate of flow within certain time limitations.

An object of the invention is to overcome the disadvantages enumerated above and to provide a simple, inexpensive liquid feeding device capable of delivering fluid at a specific rate of flow with a high degree of accuracy.

Another object of the invention is to produce a liquid feeding device which will automatically vary the rate of flow of fluid delivered readily and positively according to any preselected schedule or the immediate will of the operator and consistently maintain a high degree of accuracy.

Another object of the invention is to produce a liquid feeding device which will follow any selected schedule of either constant or varying discharge or flow of the liquid with a high degree of accuracy.

A further object of the invention is to produce a liquid feeding device which can be controlled by a cam and cam follower rod or other positioning device such that the discharge will vary as the first power of the displacement of the cam follower rod or other positioning device.

A still further object of the invention is to provide an automatically controlled fluid feeding device which can be readily adjusted to accurately control the rate of fluid feed to any desired values within a wide range.

The flow control valve of the present invention involves a new and useful form of rectangular orifice, the size of which may be varied to deliver selected rates of flow of water or other fluids by a sliding gate. One possible use of this device would be for the control of fluid feeding into hydraulic models wherein flow is introduced on a preselected varying discharge hydrograph.

Figure 1:
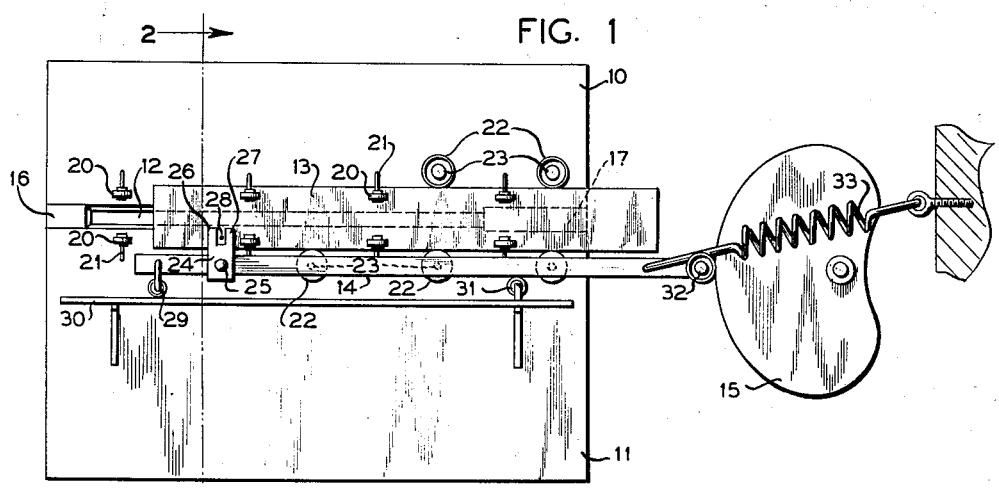
Figure 2:
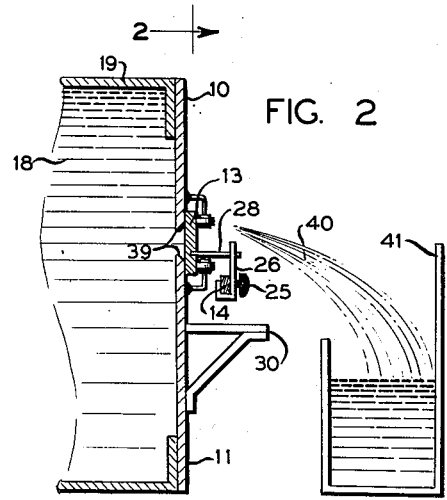
Figure 4:
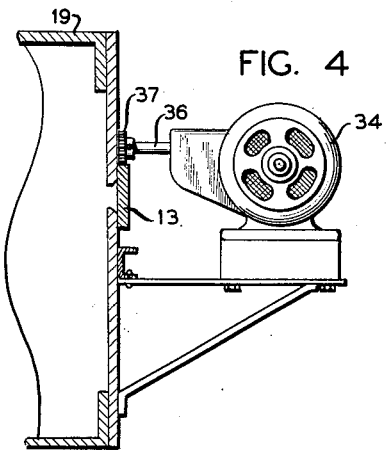
Figure 3:
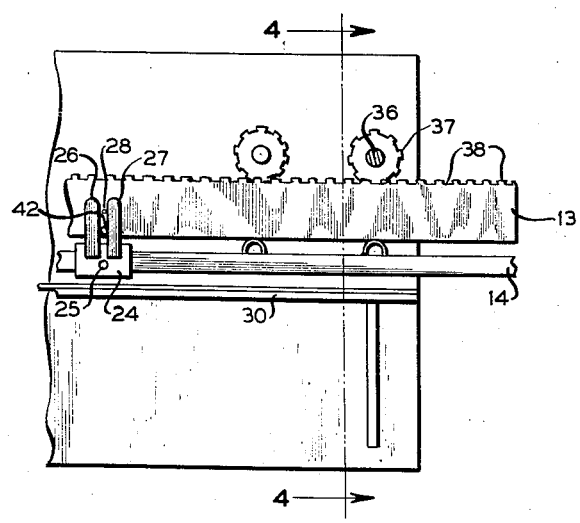
Figure 5:
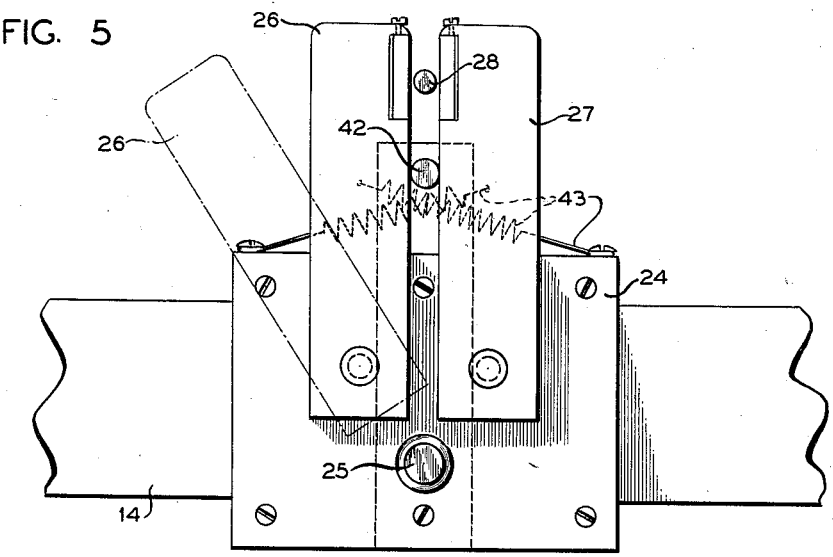
Figure 6:
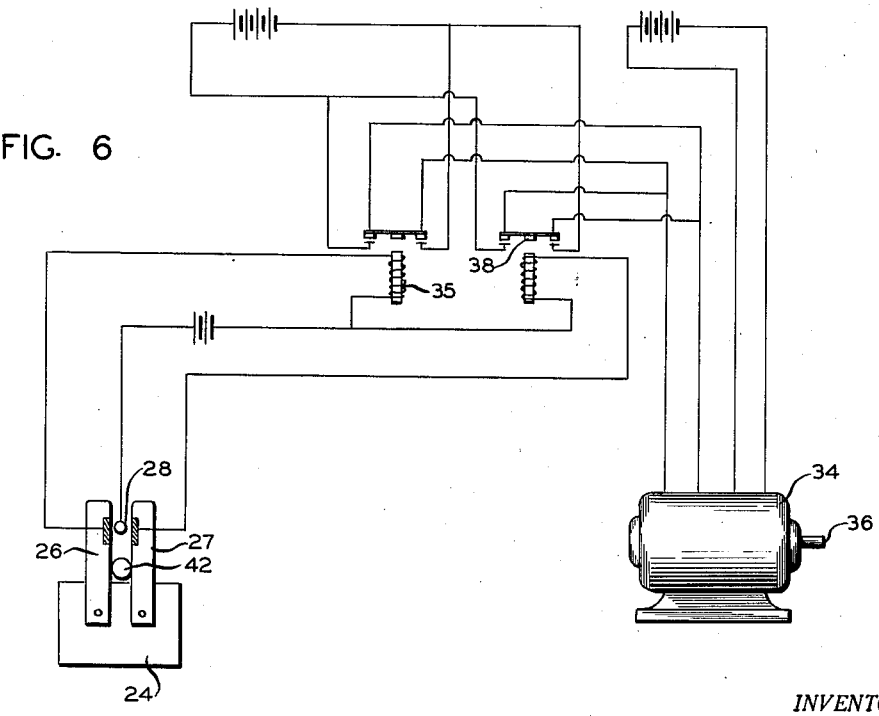

Further objects and advantages of the invention will be apparent from the following description taken in conjunction with the drawings wherein:

Fig. 1 is a front elevation illustrating one application of the invention;

Fig. 2, a section on lines 2—2 of Fig. 1;

Fig. 3, a partial front elevation illustrating one application of the invention utilizing an electric motor as means of actuating the sliding gate;

Fig. 4, a section on the lines 4—4 of Fig. 3;

Fig. 5, a detailed view on an enlarged scale showing the pronged positioner designed to utilize a separate source of power; and Fig. 6, an electric circuit diagram illustrating one application of the invention utilizing a separate source of power to activate the sliding gate.

Referring to the drawings, and more particularly to Figs. 1 and 2, the orifice plates 10 and 11, the rectangular orifice 12, the sliding gate 13, the cam follower rod 14 and the cam 15 are the basic elements of the preferred embodiment of the invention. The said orifice is rectangular in shape and extends across the major portion of the side wall of the container or tank 19, said side wall being formed by the orifice plates 10, 11. The orifice height is fixed for a given operation by the space between the upper orifice plate 10 and the lower orifice plate 11. The two ends of the orifice are then blocked by plugs 16 and 17, leaving the rectangular orifice open for discharge of fluid 18 confined behind the orifice plates 10 and 11.

The orifice 12 is entirely or partially blocked by a sliding gate 13 which is held against the said orifice by eight ball bearing rollers 20. These rollers are supported on shafts 21 screwed into the adjacent orifice plate 10 or 11. The sliding gate 13 is held in a horizontal position by ball bearing rollers 22 which are mounted on shafts 23 screwed horizontally into the adjacent orifice plates 10 and 11. The rate of discharge of the orifice is determined by the area of orifice not covered by the gate.

The position of the gate 13 is controlled by the cam follower rod 14 which forces the sliding gate 13 to follow its movements by means of the pronged positioner 24 which is held rigidly to the cam follower rod 14 by means of a pressure screw 25. By releasing the pressure on the screw 25, the gate 13 may readily be adjusted in its relation to cam 15. The prongs 26 and 27 of the positioner engage a contact knob 28 which is in turn fixed rigidly to the sliding gate 13. Thus any movement of the cam follower rod 14 is transmitted directly to the sliding gate. The cam follower rod is supported by a ball bearing roller 29 which is mounted thereon and which runs on track 30 and by a ball bearing roller 31 mounted on the said track.

The position of the cam follower rod is controlled by the cam 15 acting on a ball bearing roller 32 fixed to the outer end of the said cam follower rod. The cam follower rod is held against the cam by a tension spring 33 whose opposite end is anchored, to insure continuous contact of the roller against the edge of the cam.

Although the power necessary to motivate the gate 13 may be furnished by the power source driving the cam 15, the same results may be accomplished by utilizing a separate source of power as shown in Figs. 3 and 4 taken together. In this modification the two prongs 26 and 27 of the positioner 24 are made to coact with the electrical contact knob 28 fixed to and protruding from the sliding gate 13. The necessary clearance is provided by a spacer 42 fixed to the positioner 24. The spacer 42 adjusts the prongs 26 and 27 in relation to the contact knob 28 leaving the necessary clearance by reason of the slightly greater diameter of the spacer 42 than the said contact knob. The details of the pronged positioner 24 modified to be used in conjunction with the electrical motor 34 are more clearly indicated in Fig. 5. The prongs 26 and 27 are held against the spacer 42 by tension springs 43 which allow the prongs to be moved out of the way when an unusual force is applied. For example, in case of malfunctioning of the positioning system, the prongs in their flexible mounting will give in the direction of the movement, thereby allowing the prongs to slide past the contact knob preventing injury to the said system.

The sides of the prongs 26 and 27 in combination with the contact knob 28 make up two alternate paths for electrical power from a source to the motor 34. Thus if contact is made between prong 26 and contact knob 28, electrical relay 35 is closed which will in turn drive the shaft 36 of the motor 34 in a counter-clockwise direction. The motor shaft 36 has fixed on the end thereof a pinion 37 which drivingly engages rack teeth 38 formed in the upper side of gate 13. In this modification the pinion 37 takes the place of one of the ball bearing rollers 22. The details of the modification utilizing the electrical motivating power to open and close gate 13 are more clearly shown in Figs. 4 and 5. The electrical contact between prong 26 and contact knob 28 would drive the motor in such a manner that gate 13 would move in the direction necessary to break the said contact and would continue in this direction until said contact is broken. If contact were made between prong 27 and the contact knob 28, the relay 38 would be closed, which would cause the motor shaft to be driven in a clockwise direction, rotating pinion 37, thereby driving the gate in the direction necessary to break the contact between the said prong and the contact knob.

Motor 34 will furnish the power to drive the sliding gate and by the controls above described keep the said gate within the limits as determined by the clearance between the contact knob and the prongs. By setting this clearance at a very small interval the gate position will be very accurately controlled.

The orifice edges 39 of the plates 10 and 11 are beveled on the outside edge to enable the jet 40 leaving the orifice to spring clear of the said plates. The pressure of the fluid 18 on the orifice is maintained at a constant value sufficiently high to cause the jet 40 also to clear ball bearing rollers 20 and shafts 21 mounted on the lower orifice plate 11. The fluid thus delivered falls into a flume 41 which conducts the flow to the desired delivery point. The leakage around the edges of the sliding gate 13 does not find its way into the flume. Thus the only flow falling into the said flume is that delivered by the jet leaving the uncovered portion of the orifice whose area is controlled positively by the movement of the sliding gate.

The pressure in the fluid 18 in the container 19 is maintained at a selected constant value either by the use of a constant head tank or an automatic pressure-regulating valve of commercial design or through suitable pressure regulating means, not shown. The fact that the velocity of flow from the orifice 12 varies as the square root of the effective pressure reduces the value of any error introduced by variations in the fluid pressure to the square root of these variations, which is a desirable relation. The orifice 12 is above the level of the flume 41 and discharges water into the atmosphere, thereby eliminating any possible error from hydraulic back pressure.

With a substantially constant effective fluid pressure maintained against the orifice and no back pressure other than the atmosphere, the discharge from the orifice 13 will then vary directly as its area. As the height of the orifice is maintained constant by the setting of the orifice plates 10 and 11, the area of the orifice and the rate of discharge are controlled directly by the length of the orifice left clear by the sliding gate 13. With a constant fluid pressure on the orifice this discharge will vary directly as the first power of the length of the orifice opening. The length of the orifice opening is in turn controlled directly by the position of the cam 15.

The cam 15 can be set manually to give a desired discharge for desired length of time; or, it can be driven at a constant rate and so shaped as to cause the orifice to deliver a preselected schedule of discharge; or, it can be positioned by remote control, to give any desired rates of discharge, either constant or varying.

It will be obvious to those skilled in the art that various changes may be made in the apparatus embodying the invention without departing from the spirit and scope thereof and therefore the invention is not limited by that which is shown in the drawing and described in the specification but only as indicated in the appended claims.

What is claimed is:

1. Apparatus for supplying liquid at a predetermined rate comprising a constant pressure container having in one side thereof an orifice disposed below the liquid level in said container, said orifice having its major dimension in a horizontal direction and a vertical dimension so limited that the difference in hydraulic head between the bottom and top of the orifice is insufficient to introduce material error in the control of liquid flow therethrough; a horizontally disposed longitudinally slidable gate supported on said container wall in position to cover any desired portion of said orifice and thereby vary the area of the liquid discharge opening, antifriction means carried by said container wall and supporting said gate; a longitudinally movable member substantially parallel to said gate; gate connecting means connectable to said member at any desired position lengthwise thereof; antifriction means supporting said member on said container wall; a cam bearing against one end of said member and rotatable to impart longitudinal movement to said member to thereby move said gate along said orifice; and resilient means maintaining said member in operative contact with said cam.

2. A liquid feeding device comprising a container for a body of liquid; a rectangular horizontally elongated orifice in the side of said container; means for varying the area of said orifice comprising a gate positioned to overlap said orifice and horizontally slidable to vary the open area of said orifice; a rotatable cam; a rod connected to said gate and bearing against the outer edge of the cam; a spring member holding said rod in operative contact with said cam so that movement of the cam is transmitted through said rod to said sliding gate; anti-friction means supporting said sliding gate on said container; and an adjustable connection between said gate and said rod to adjust the relationship between said sliding gate and said cam.

3. A liquid feeding device comprising a container for a body of liquid; a rectangular orifice in the side of said container at a level to which it is subjected to a hydraulic head by the liquid in the container; gate means slidably supported on said container for varying the opening of said orifice; means operative to apply external power to said gate to move said gate relative to said container; an adjustable connection between said external power means and said gate; control means comprising an electrical positioning device carried by said gate and said connecting means operative to control said external power means, said electrical positioning means having movable portions for protecting said means against injury caused by malfunctioning of said external power means.

4. A variable orifice flow-control apparatus comprising a container for a body of liquid; said container having a side with an orifice in the side consisting of a rectangular elongated opening whose length horizontally greatly exceeds its width vertically and having beveled edges; orifice varying means comprising a sliding gate held adjacent to said container side in position to overlap the beveled edges of said orifice; rollers secured to the side of the container to hold the sliding gate adjacent to said container side; a member operatively connected to said gate to slide said gate horizontally along said orifice thereby to vary the length of the orifice; and control means acting through said member to operate said gate to control the flow of the liquid through said orifice whereby said flow may be accurately delivered at the desired rate over a predetermined time interval.

5. A variable orifice flow-control apparatus comprising a container, said container having a side provided with an elongated horizontally extending orifice; gate means supported adjacent to said container to vary the discharge from said orifice; means for operating said gate means to control the flow of liquid through said orifice to discharge a predetermined quantity of liquid within a predetermined time interval, said gate operating means comprising a rod member substantially parallel to said gate, electrically driven means connected directly with said gate to move the gate relative to said orifice, control means operative to move said rod member, an electrical positioning device between said rod member and said gate operative to control said electrically driven means to move said gate in a manner to follow up movements imparted to said rod member by said control means, and a flume below said orifice conveying away liquid discharged through said orifice.

JOSEPH MORTON CALDWELL.

REFERENCES CITED

The following references are of record in the file of this patent:

UNITED STATES PATENTS

| Number | Name | Date |
| --- | --- | --- |
| 240,564 | Ware | Apr. 26, 1881 |
| 748,059 | Ferrell | Dec. 29, 1903 |
| 868,776 | Gregory et al. | Oct. 22, 1907 |
| 917,381 | Twiford | Apr. 6, 1909 |
| 1,064,908 | Hornung | June 17, 1913 |
| 1,216,698 | Keeler | Feb. 20, 1917 |
| 1,247,952 | Gamble et al. | Nov. 27, 1917 |
| 1,258,867 | Burnham | Mar. 12, 1918 |
| 1,501,041 | Cutler | July 15, 1924 |
| 1,582,715 | Wensley | Apr. 27, 1926 |
| 1,635,414 | Hirst | July 12, 1927 |
| 2,183,026 | Mason | Dec. 12, 1939 |